United States Patent
Chen et al.

(10) Patent No.: US 12,284,101 B2
(45) Date of Patent: Apr. 22, 2025

(54) BLIND SCAN FOR MULTI-CARRIERS AND MULTI-TECHNOLOGIES AND SEAMLESS SIGNAL ANALYSIS

(71) Applicant: VIAVI SOLUTIONS INC., Chandler, AZ (US)

(72) Inventors: Wei Chen, Potomac, MD (US); Nick Ghaemi, Germantown, MD (US); Hyuck-In Kwon, Seoul (KR); Jin-Ook Kim, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 366 days.

(21) Appl. No.: 17/885,913

(22) Filed: Aug. 11, 2022

(65) Prior Publication Data

US 2023/0052023 A1 Feb. 16, 2023

Related U.S. Application Data

(60) Provisional application No. 63/232,608, filed on Aug. 12, 2021.

(51) Int. Cl.
*H04L 43/0852* (2022.01)
*H04L 41/22* (2022.01)

(52) U.S. Cl.
CPC .......... *H04L 43/0852* (2013.01); *H04L 41/22* (2013.01)

(58) Field of Classification Search
CPC . H04L 43/0852; H04L 41/22; H04W 28/0917
See application file for complete search history.

(56) References Cited

U.S. PATENT DOCUMENTS

| | | | | |
|---|---|---|---|---|
| 2002/0163540 | A1* | 11/2002 | Kishimoto | G09G 5/006 715/762 |
| 2006/0176951 | A1* | 8/2006 | Berman | H04N 21/6587 375/240.01 |
| 2007/0097908 | A1* | 5/2007 | Khandekar | H04L 27/2602 370/335 |
| 2007/0098089 | A1* | 5/2007 | Li | H03J 1/0091 348/E5.097 |
| 2008/0074181 | A1* | 3/2008 | Mizuno | H03D 3/001 329/303 |
| 2014/0274132 | A1* | 9/2014 | Abdelmonem | H04B 17/26 455/456.2 |
| 2014/0329469 | A1* | 11/2014 | Wu | H04L 43/045 455/67.7 |
| 2015/0109946 | A1* | 4/2015 | Sharma | H04W 24/08 370/252 |
| 2015/0200758 | A1* | 7/2015 | Wakabayashi | H04L 5/0053 370/329 |
| 2018/0359760 | A1* | 12/2018 | Su | H04W 72/1215 |

(Continued)

*Primary Examiner* — Michael Thier
*Assistant Examiner* — Tracy Lauren Colbert
(74) *Attorney, Agent, or Firm* — Mannava & Kang, P.C.

(57) ABSTRACT

A test device for performing a bling scan includes a digital blind scan circuit. The blind scan circuit includes digital detectors for multiple cellular technologies that simultaneously perform correlation in a baseband frequency range to detect whether received RF signals include a channel of the technologies. The test device launches, responsive to detecting a channel from the blind scan, a signal analysis or a spectrum analysis application for the channel according to a carrier frequency and a technology identified for the channel by the blind scan.

18 Claims, 12 Drawing Sheets

(56) References Cited

U.S. PATENT DOCUMENTS

2019/0274127 A1* 9/2019 Nammi ............... H04B 7/088
2021/0282104 A1* 9/2021 Sagar ................. H04W 76/16
2023/0163919 A1* 5/2023 Jiang ............... H04L 27/26025
                                                                                        370/329

* cited by examiner

BLIND SCAN FOR MULTI-CARRIERS AND MULTI-TECHNOLOGIES AND SEAMLESS SIGNAL ANALYSIS

TECHNICAL FIELD

This patent application is directed to conducting a blind scan for spectral analysis in telecommunication networks.

BACKGROUND

Receivers are used in many applications to receive incoming radio frequency (RF) signals and convert them to baseband signals for desired processing. These receivers exist in cellular networks and other networks, and are typically coupled to receive incoming RF signals from an antenna and process the signals accordingly. An RF spectrum typically includes many individual channels, and these channels are separated by some predetermined spacing, and the bandwidth of given channels can vary. A receiver may include a list of available channels within the RF spectrum and their center or carrier frequencies, among other such information. In certain instances, carrier frequencies can change over time. Accordingly, a blind scan may be performed to search for and locate available carrier frequencies. However, existing blind scan functionality is relatively inefficient and requires significant time to perform analysis of an RF spectrum.

Furthermore, most conventional signal analysis applications for cellular networks require a user to select a corresponding technology, e.g., 4G Long Term Evolution (LTE), 5G New Radio (NR), Dynamic Spectrum Sharing (DSS), etc., and then enter a valid carrier frequency. The user may not know the valid carrier frequency, and determining the valid carrier frequency can be a tedious and error prone process. Furthermore, a cellular service provider installing cell sites have the challenge of setting the proper carrier frequency for signal analysis to provide their customers with optimum cellular service. If valid carrier frequencies are not known or if the valid carrier frequency is not manually entered correctly, interference and other issues with the RF channels can be difficult to detect and correct.

Additionally, Citizens Broadband Radio Service (CBRS) band has a General Authorized Access (GAA) portion, which is unlicensed. The GAA portion is 3550-3700 MHz band, and users are permitted to use any portion of the 3550-3700 MHz band not assigned to a higher tier user and may also operate opportunistically on unused priority access channels. Accordingly, the channel is dynamically changed and is not same at every location. Configuring instruments to evaluate the RF performance of the channel under test in these environments where channels are dynamically assigned at different locations is a time-consuming process for RF engineers.

BRIEF DESCRIPTION OF DRAWINGS

Features of the present disclosure are illustrated by way of example and not limited in the following Figure(s), in which like numerals indicate like elements, in which:

FIGS. 2B-1 to 2B-3 illustrate detectors sweeping a frequency range to execute a blind scan, according to an example;

FIGS. 3-6 illustrate graphical user interfaces of the test device, according to examples;

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure, a test device is operable to perform a blind scan that automatically detects multiple carriers, e.g., available channels, for multiple technologies (e.g., 4G, 5G, DSS, etc.). Furthermore, responsive to detecting carriers for technologies from the blind scan, the test device can seamlessly perform signal analysis, and auto trigger interference hunting and beam centric Electromagnetic Field (EMF) testing on a selected carrier For example, the blind scan is invoked on the test device to provide a quick and automatic way to discover carrier frequencies with multiple technologies for a user. When the user selects a discovered carrier frequency and technology for in-depth analysis, the test device can seamlessly launch a corresponding signal analysis on the test device by transferring all needed parameters. This two-step signal discovery and analysis optimizes search time and automates testing. Furthermore, in time division duplex (TDD) networks, such as used for TDD-LTE and other technologies employing TDD, the downlink (DL) and uplink (UL) use the same frequency band in different timeslots. When viewing such TDD signals on a conventional spectrum display, it is difficult to differentiate the two as well as any other unwanted signals present in the same spectrum. This makes interference hunting extremely difficult. Since TDD system use the same frequency band for UL and DL, knowing the duplexing type, frame structure, and bandwidth information as determined by the test device can provide a complete information for accurate interference hunting. For EMF analysis, all active carrier frequencies at a location can be automatically discovered. Moreover, by combining with seamless signal analysis, EMF analysis achieves correct extrapolation factors required to evaluate the potential EMF exposure level. The test device can be a portable, battery powered device with a display capable of displaying graphical user interfaces for receiving user input and displaying blind scan and signal analysis results and other relevant information.

Figure 1:
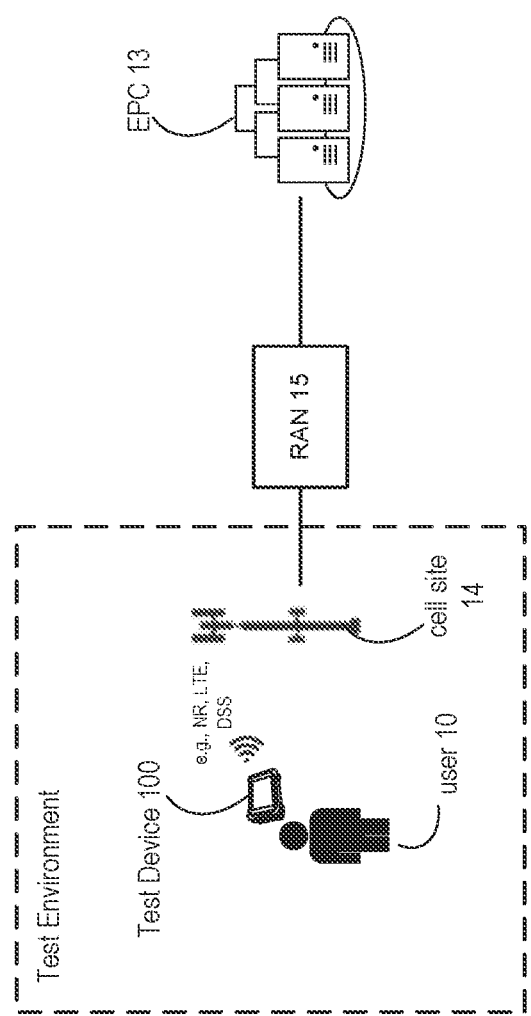
FIG. 1 illustrates a test device in a test environment, according to an example.

FIG. 1 illustrates a test device 100 performing blind scan and signal analysis, according to an example of the present disclosure. In an example, a user 10, such as a cellular service provider technician, may use the test device 100 to perform the blind scan, and then use the discovered carrier frequency and technology to perform follow-on signal analysis for the discovered channels of selected technologies. Furthermore, interference hunting and beam centric EMF testing on a selected carrier may be performed with the test device 100. In an example use case, the blind scan and testing may be performed when the cell site is being installed, such as to ensure proper operation of the cell site with user devices, such as smartphones or other end user cellular devices. In another example use case, after installation, customers of the cellular service provider may be having technical issues, and the user 10 uses the test device 100 to check for signal interference or other potential causes of the technical issues so the technical issues can be resolved.

In an example, the test environment may include cell site 14, which includes a cell tower or cellular base station having antennas and electronic communications equipment to support cellular mobile device communication. The antennas and equipment are typically placed in connection with a radio mast or tower, and the equipment generally connects cell site air interfaces to wireline networks, which may be comprised of fiber optic cables and coaxial cables. Typically, the cell site 14 may be connected to backhaul via a radio access network (RAN) 15 and the backhaul connects to Evolved Packet Core (EPC) 13.

As discussed above, the test device 100 is operable to perform a blind scan that provides automatic channel detection for technologies. For the automatic channel detection of the blind scan, the test device 100 can detect carrier frequencies of available channels for one or more technologies. The carrier frequencies may be a center frequency and/or a Synchronization Signal Block (SSB) frequency depending on the technology. The technologies for the blind scan can be selected by the user 10 or the blind scan can default to all or a subset of the technologies without requiring user input. Some examples of the technologies may include LTE-FDD, LTE-TDD, NR, DSS-FDD, DSS-TDD where FDD is frequency division duplex and TDD is time division duplex, but the blind scan may be done for other technologies. In an example, the blind scan may be performed for the downlink channel in FDD/TDD mode.

Figure 2A:
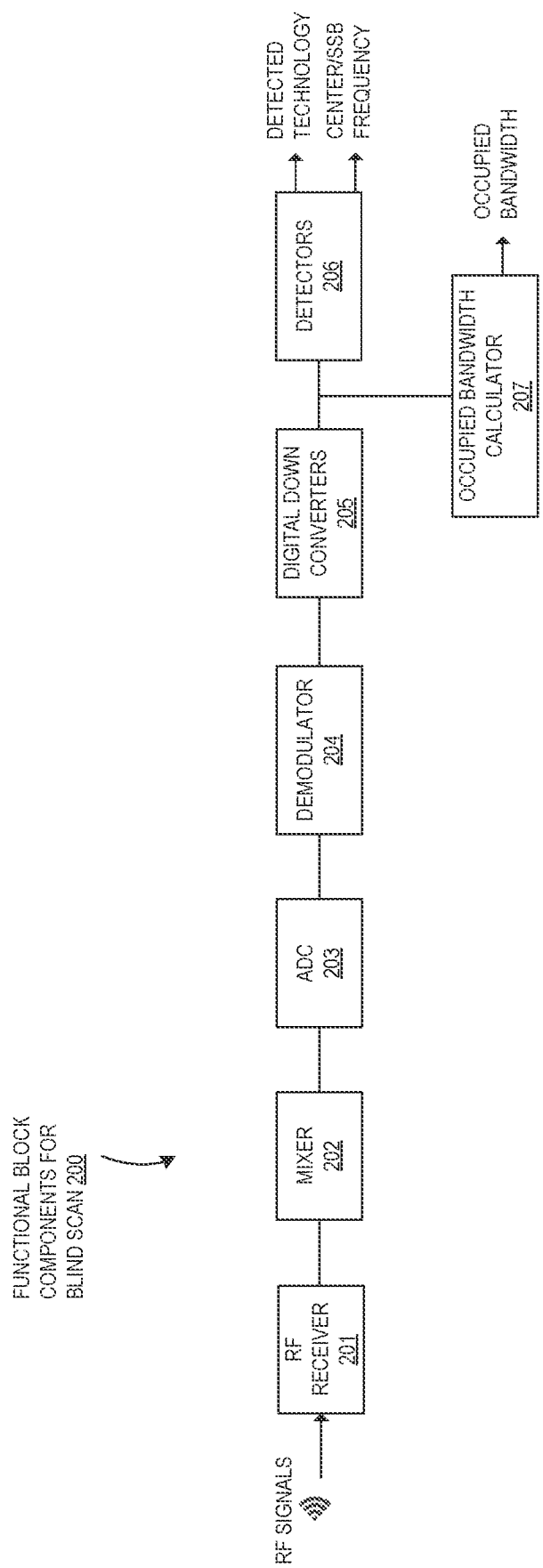
FIG. 2A illustrates components of a blind scan circuit, according to an example.

FIG. 2A shows an example of components 200 of a blind scan circuit of the test device 100. The components may be implemented in hardware and/or software. Also, the test device 100 may include additional components not shown as are known in the art. An RF receiver 201 receives RF signals for example from cell site 14. The RF signals are received and down converted to the intermediate frequency (IF) by a down-conversion mixer 202.

The IF signals are converted from analog to digital signals by analog-to-digital converter (ADC) 203. The digital signals may then be processed by digital circuitry to detect channels for the technologies if any are found. The digital circuitry may include demodulator 204, digital down converters 205 and detectors 206. Demodulator 204, e.g., a quadrature demodulator, demodulates the received digital signals, and information from the demodulated signals, including I and Q signals, are passed to digital down converters 205 to convert to the baseband frequency in the digital domain for each technology. Detectors 206 can then detect channels for their technologies if any are found from the digital down converted signals. The output of each of the detectors 206 may include an identified technology and a carrier frequency for an identified channel for the technology if a channel for the technology is found by the detector. Thus, the output from the detectors 206 includes an identified technology and a carrier frequency (e.g., center frequency or SSB frequency) for each channel identified by the detectors 206.

The down converters 205 and detectors 206 may include a down converter and detector for each technology. The down converters 205 for each technology down convert based on the sampling rate for the channels to be detected. Each of the detectors 206 performs correlation to determine whether a signature for a particular technology is present in the digital baseband frequency domain. The 3GPP standard for LTE and NR specifies the signature (i.e., pattern) for each technology which is used in the correlation to determine whether the received signals include the signature for the particular technology. In an example, conventional primary synchronization signal (PSS) correlation may be used by the detectors to identify whether the digital baseband frequency domain includes a channel for a particular technology. PSS correlation is commonly used for LTE and NR for user equipment performing a cell search. Also, a portion of the signal is demodulated to determine I and Q data.

To perform PSS correlation by the detectors 206, the demodulator 204 demodulates a portion of the received RF signals that includes the synchronization information instead of demodulating the entire bandwidth. For example, for a 20 MHz LTE channel, the primary synchronization signal, which is used for signature matching performed by the correlation, is located in time slot 0 in subframe 0. In particular, the primary synchronization signal and the secondary synchronization signal occupy six resource blocks at a known location within time slot 0. The primary synchronization signal is repeated every 5 milliseconds, such as in subframe 0, and then in subframe 5. The correlation searches for this primary synchronization signal based on its predetermined location in time slot 0 to detect whether the received RF signals include the LTE channel. Accordingly, the demodulator 204 demodulates a portion of the bandwidth of the LTE channel to be detected where the primary synchronization signal should be located. In particular, the primary synchronization signal is mapped into the first 31 subcarriers on either side of the DC subcarrier or equivalently 930 kHz (=62×15 kHz). Thus, instead of demodulating the entire 20 MHz bandwidth of a 20 MHz LTE channel, only a small portion of the bandwidth containing the primary synchronization signal is demodulated for the blind scan. A similar process is performed for NR and DSS correlation. Conventionally, to perform a blind scan, signals in a frequency range corresponding to an entire channel are demodulated, which takes significantly more time than demodulating the portion of the channel where the primary synchronization signal should be located, such as discussed above. This time savings can be on the order of 20-100 times. For example, a blind scan for a channel corresponding to a band number defined by the 3GPP standard for a single technology may be performed in less than or equal to 3 seconds. The blind scan for a larger frequency range, such as 400 MHz to 6000 MHz, may be performed in 30 seconds or less for a single technology. Furthermore, the blind scan for each technology may be done in parallel as is discussed below to improve time savings.

According to an example of the present disclosure, the detectors 206 operate in parallel to simultaneously detect whether channels for the technologies, and corresponding carrier frequencies for the channels, are present in the received signals. The down converters 205 and detectors 206 can operate in parallel so the detection of channels for multiple technologies can be performed simultaneously which reduces the amount of time to perform the blind scan.

Figures 1, 2B:
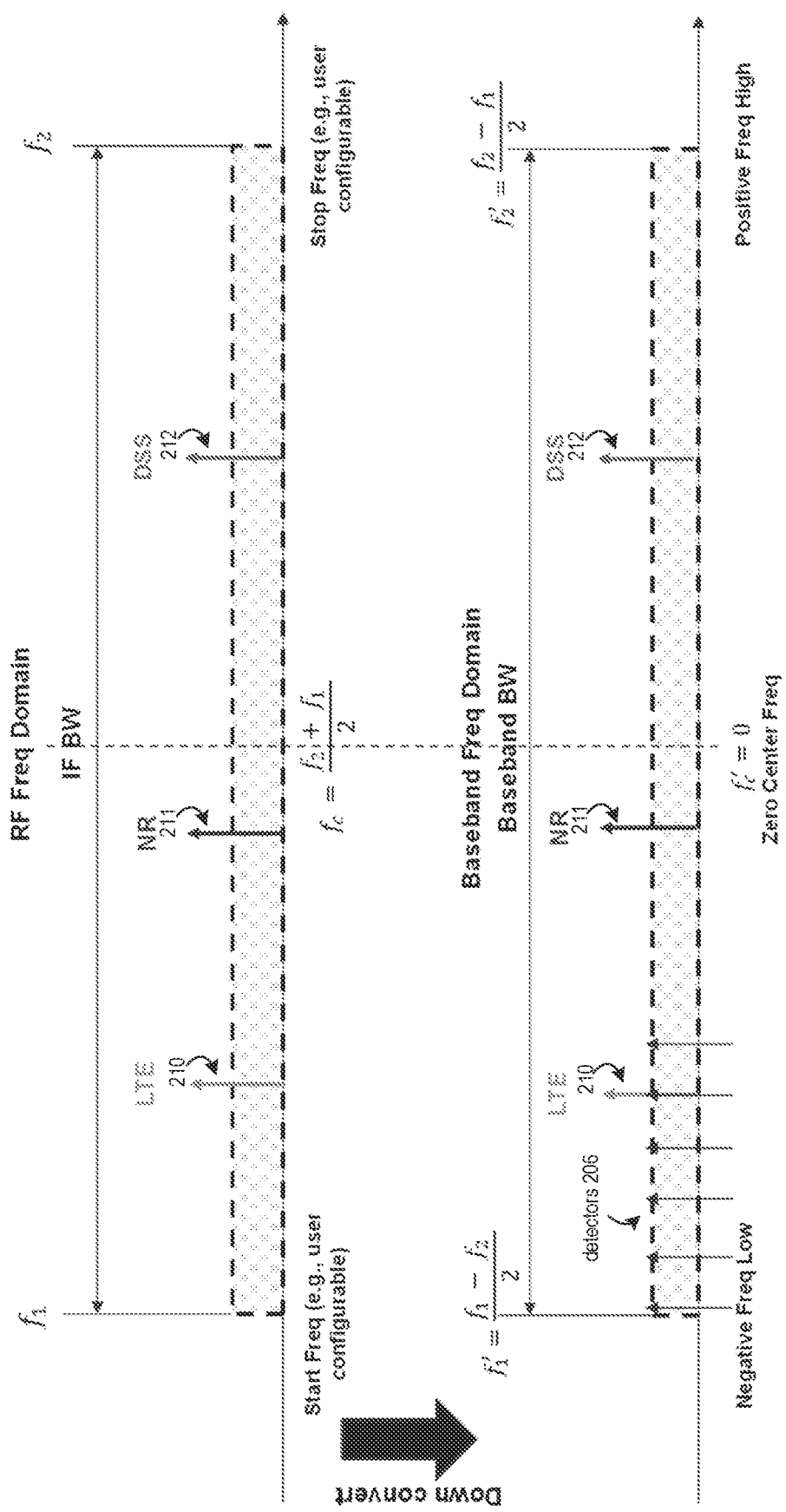

FIGS. 2B-1 through 2B-3 show an example of the detectors 206 operating in parallel. Referring to FIG. 2B-1, assume the received RF signals include LTE signals 210, NR signals 211 and DSS signals 212 which are shown. The RF frequency domain includes the received RF signals that are converted to the IF by the down-conversion mixer 202. The RF frequency domain of IFs includes a frequency range $f_1$ to $f_2$ for the blind scan. The frequency range for the blind scan may be set by the user 10 of the test device 100 via a GUI. A center frequency in the RF frequency domain is calculated as follows: $f_c=(f_2+f_1)/2$.

Figures 2, 2B:
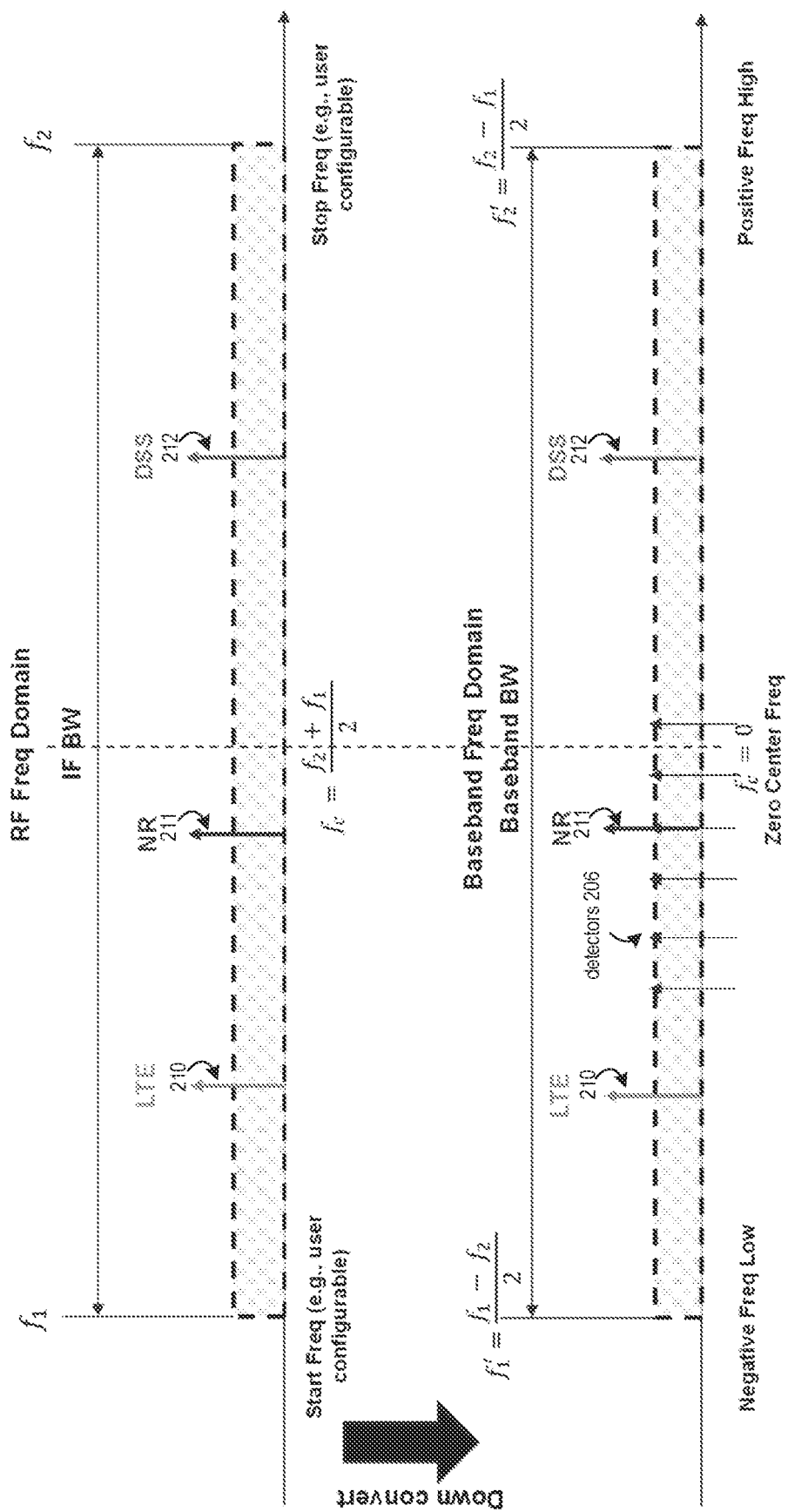
Figures 2, 2B, 3:
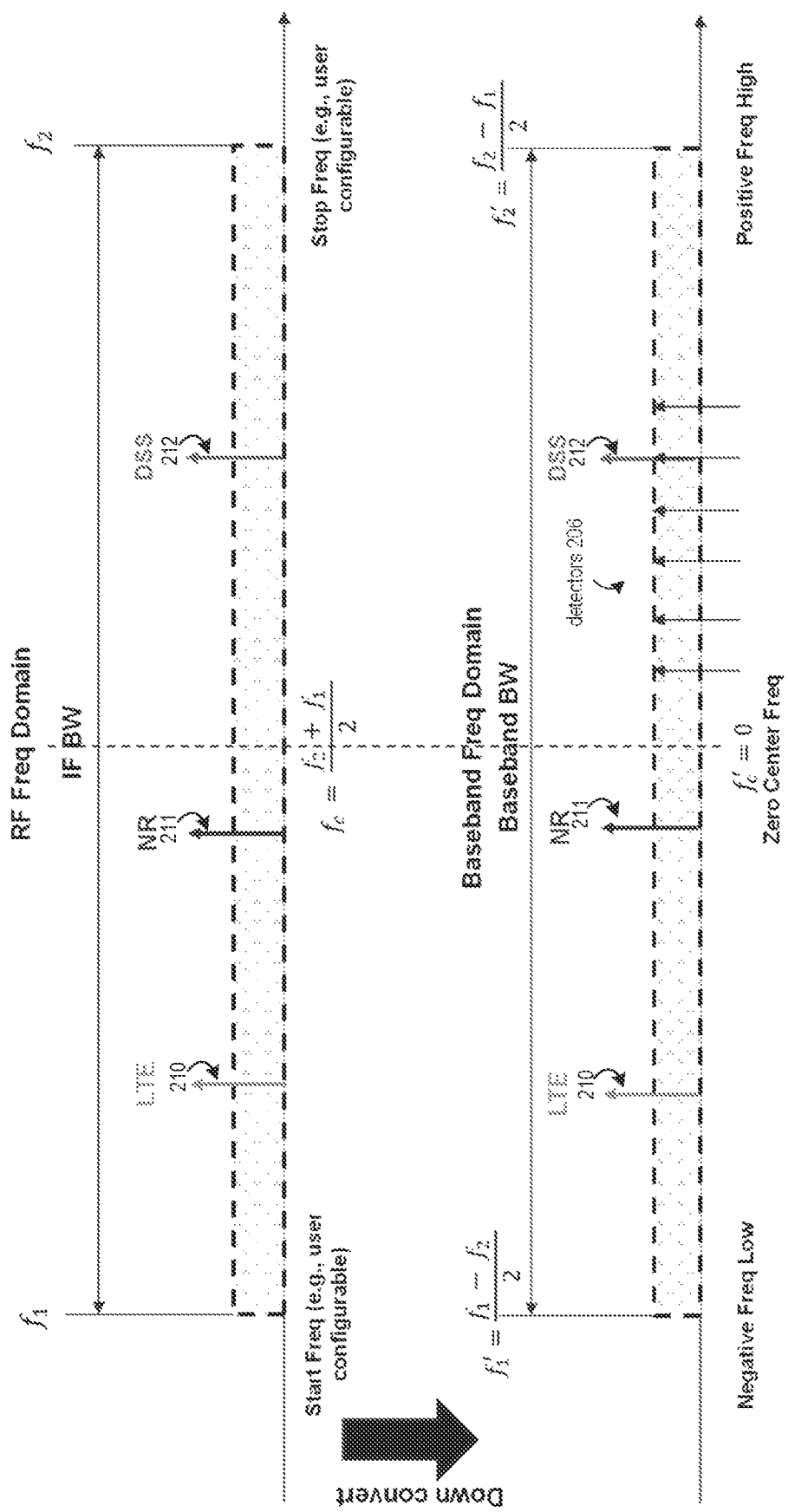
Figure 3:
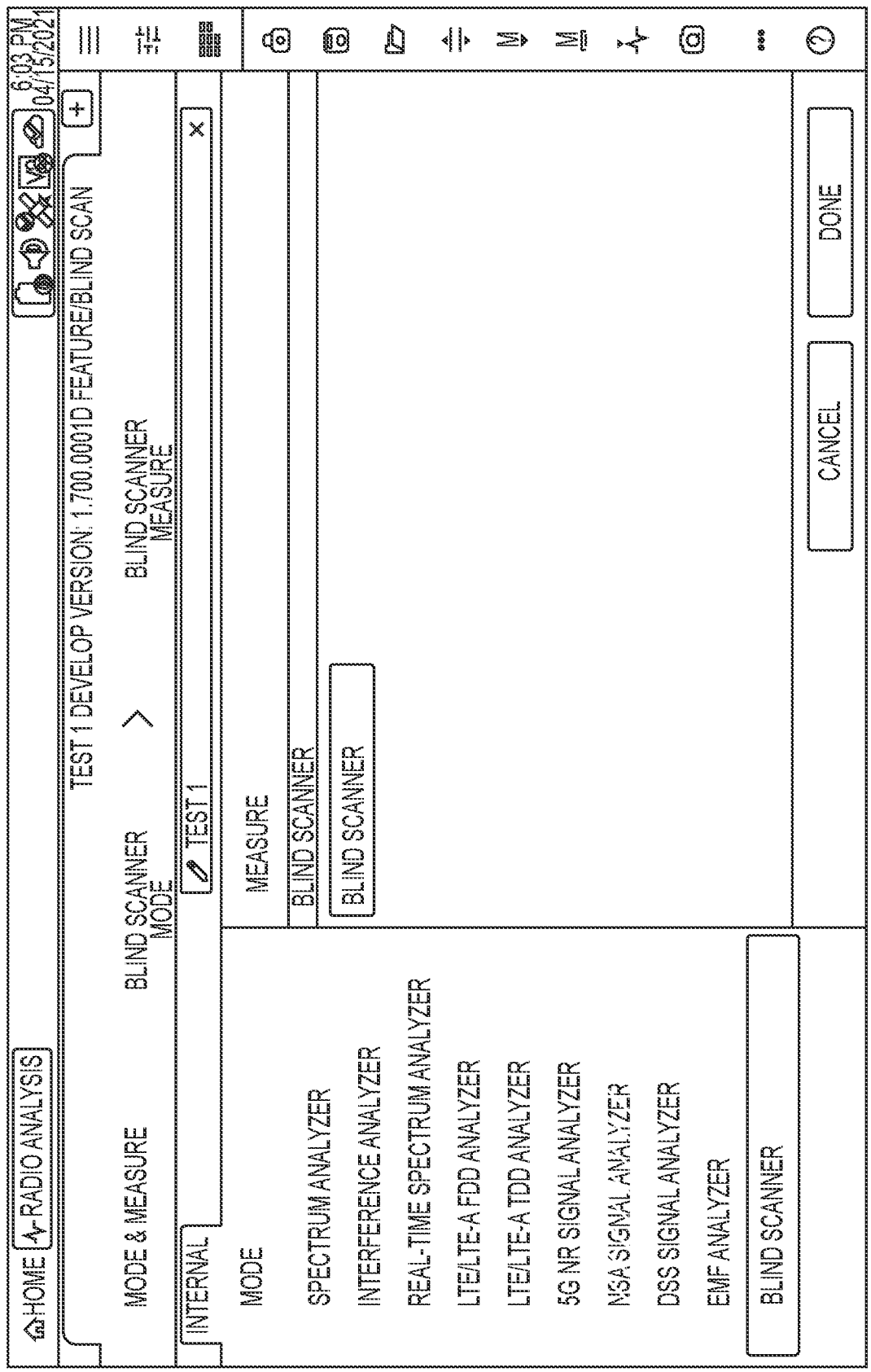

The IF signals are converted from analog to digital signals by the ADC 203 and down converted to the baseband frequency domain by the down converters 205. To convert to the baseband frequency domain, the center frequency $f_c'=0$ in the baseband frequency domain is mapped to $f_c$ from the RF frequency domain. The frequency range $f_1'$ to $f_2'$ for the blind scan to be performed in the baseband frequency domain is determined where $f_1'=(f_1-f_2)/2$ and $f_2'=(f_2-f_1)/2$, and negative frequencies are less than the center frequency $f_c'$ and positive frequencies are greater than the center frequency $f_c'$. Also, the detectors 206 operate in parallel to sweep the frequency range $f_1'$ to $f_2'$ by performing correlation to detect whether signals (e.g., channels) of the technologies are present in the frequency range $f_1'$ to $f_2'$. In FIGS. 2B-1 to 2B-3, the up arrows represent detectors 206, and in this example the detectors 206 include six detectors. As shown, in FIG. 2B-1 a first subrange of the frequency range $f_1'$ to $f_2'$ is checked by the detectors 206 to determine whether the subrange includes signals for any of the technologies, then as shown in FIG. 2B-2, a second subrange is checked, and then as shown in FIG. 2B-3, a third subrange is checked and so on, until the entire frequency range $f_1'$ to $f_2'$ is checked by the detectors 206. For each technology, the detectors 206 perform correlation to determine whether a predetermined, repeatable pattern, which is specified by the 3GPP standard, is present. If a pattern is identified, the corresponding technology for the pattern is determined along with the carrier frequency, and presented on the test device 100.

For example, the LTE signals 210, NR signals 211 and DSS signals 212 are identified by the detectors 206 and a carrier frequency is determined for each of the signals. This information is presented in a GUI of the test device 100 as is further discussed below. The 3GPP standard for LTE and NR specifies the signature (i.e., pattern) for each technology which is used in the PSS correlation to determine whether the received signals include the signature for the particular technology.

Although not shown, the components shown in FIG. 2A may include a filter for scanning a desired frequency band. For example, the user 10 may set a frequency band f1 to f2 to scan, and a filter is used to scan the desired frequency band for each of the technologies.

The components shown in FIG. 2A may also include an occupied bandwidth calculator 207 to determine occupied bandwidth for LTE and DSS. Occupied bandwidth is relevant for DSS because DSS is an overlay of NR and LTE. The technologies are based on timeslot for TDD or subcarrier for FDD. In DSS, LTE and NR share the same spectrum but all the LTE signals can only be in the occupied bandwidth. Note that in DSS, there are many options for LTE and NR to share the same spectrum, and the test device 100 can generate a display that shows how the spectrum is shared for DSS. The occupied bandwidth calculator 207 can determine the occupied bandwidth from the I and Q information determined from the demodulated signals. For example, the master information block is decoded to determine the occupied bandwidth. In an example, the occupied bandwidth calculator 207 is implemented in software and other components of the digital circuitry shown in FIG. 2 are implemented in hardware, such as an FPGA.

The test device 100 may generate graphical user interfaces (GUIs) via a display to receive user input and display output. FIGS. 3-6 provide some examples of the GUIs. The test device 100 can perform the blind scan and then automatically use the output from the blind scan to perform signal analysis, such as to detect interference or other signal performance issues. After performing the blind scan, the test device can seamlessly launch corresponding signal analysis applications for any relevant technologies that are detected. Due to the automatic population of parameters determined from the blind scan into signal analyzers, the user 10 does not have to manually enter this information into the signal analyzers and it promotes efficiency and accuracy for the signal analysis. Also, the user 10 has the option to select a signal or spectrum analysis to perform as needed. FIG. 3 shows a GUI whereby the user 10 can select from different modes including blind scanner mode or one of the signal or spectrum analyzer modes. In this example, the blind scanner mode is selected.

Figure 4:
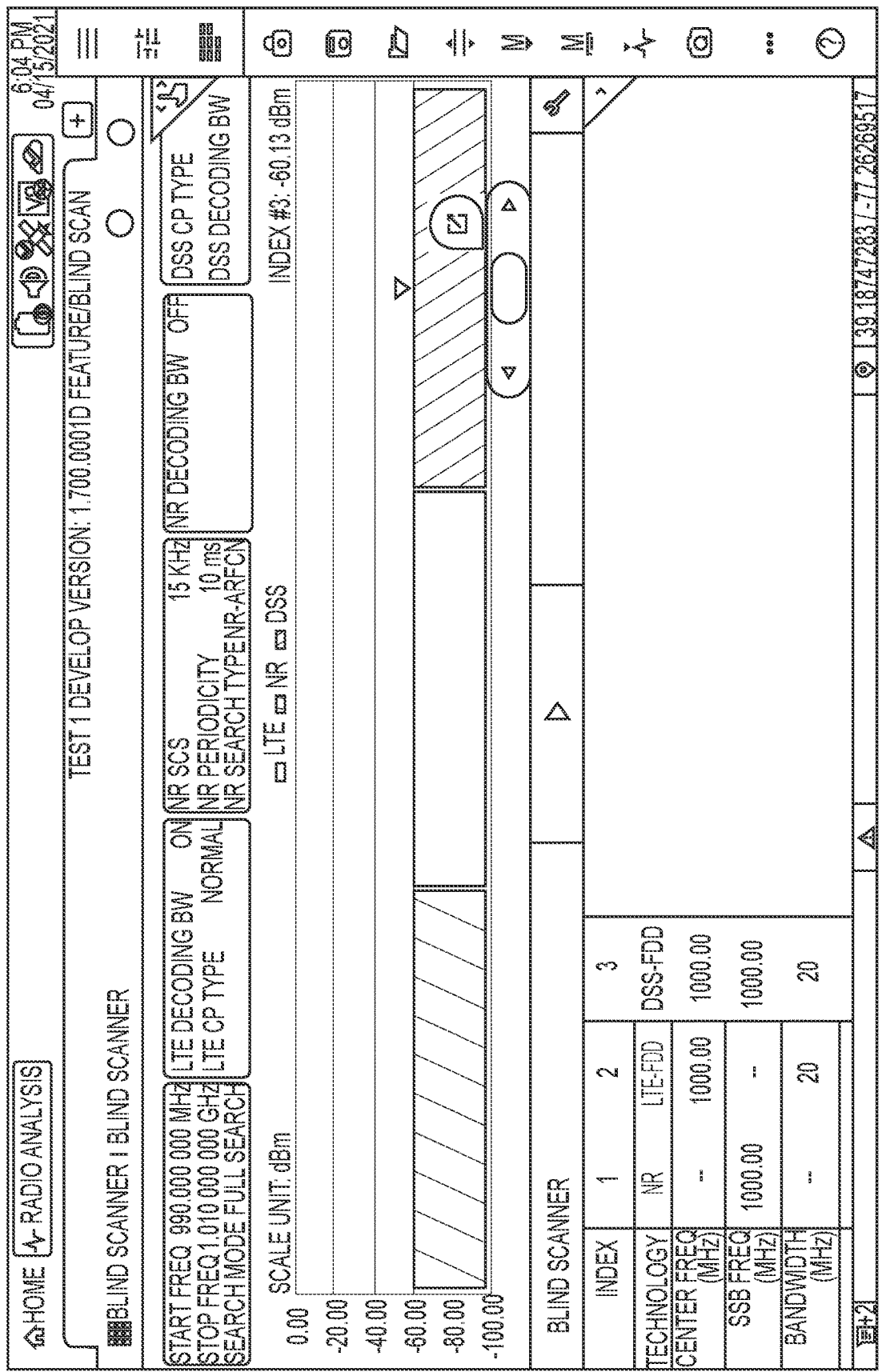

FIG. 4 shows a GUI for the blind scanning mode. A frequency band may be selected by the user 10 for the blind scan. For example, the user 10 enters a start frequency and stop frequency $f_1$ to $f_2$, representing the low end and high end of the selected frequency band. If user does not remember the frequency band to scan, the user 10 can select a band search (not shown) where the test device 100 automatically determines and displays frequency bands within the range that are assigned by 3GPP organization. Then, the user can select a displayed band for conducting the blind scan.

The user 10 can also select one or more technologies to search, e.g., one or more of LTE-FDD, LTE-TDD, NR, DSS-FDD, DSS-TDD. The user 10 can select them all if wanted.

The blind scan is performed and the output is displayed. As shown in this example, channels for three different technologies, i.e., NR, LTE-FDD and DSS-FDD, are found from the blind scan and displayed. Also, the carrier frequency determined for each detected channel is displayed. For example, the center frequency, i.e., 1 GHz, is identified for the LTE-FDD and DSS-FDD technologies, and the SSB frequency, i.e., 1 GHz, is identified for NR and DSS-FDD. Also, the bandwidth (e.g., occupied bandwidth), i.e., 20 MHz, is determined for LTE-FDD and DSS-FDD. Additionally, the test device 100 may determine the signal strength for signals in the detected available channels. The bar chart shows the signal strength in dBm.

Figure 5:
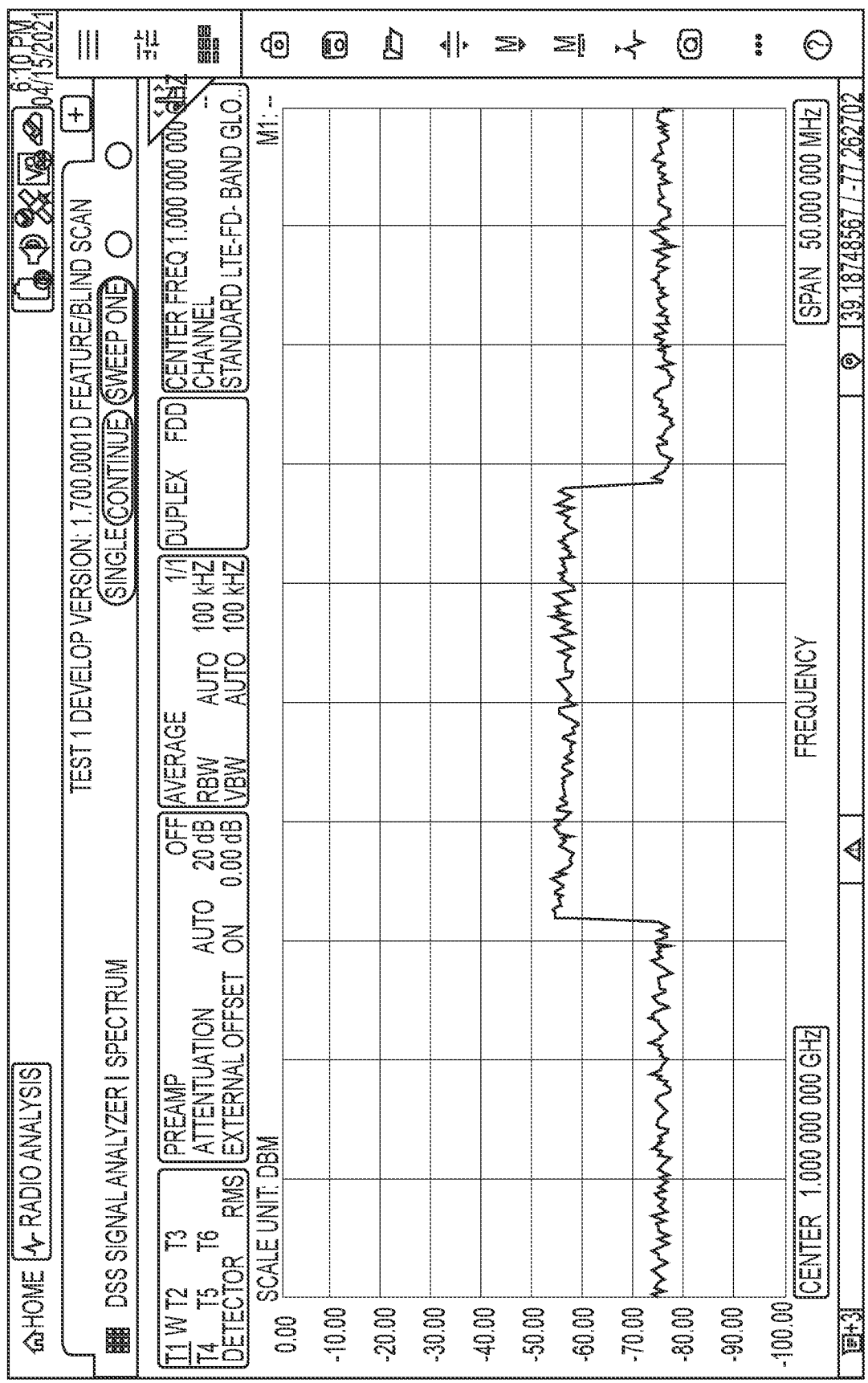

FIG. 5 shows an example GUI showing output from a spectrum analyzer for the detected DSS-FDD channel. For example, the test device 100 can launch the relevant signal analysis or spectrum analysis application, which in this example includes DSS spectrum analyzer for the detected DSS-FDD channel. As shown in FIG. 5, the occupied bandwidth is 20 MHz and the center frequency is 1 GHz. The spectrum analysis shows the signal level and frequency for the signals in the detected channel.

Figure 6:
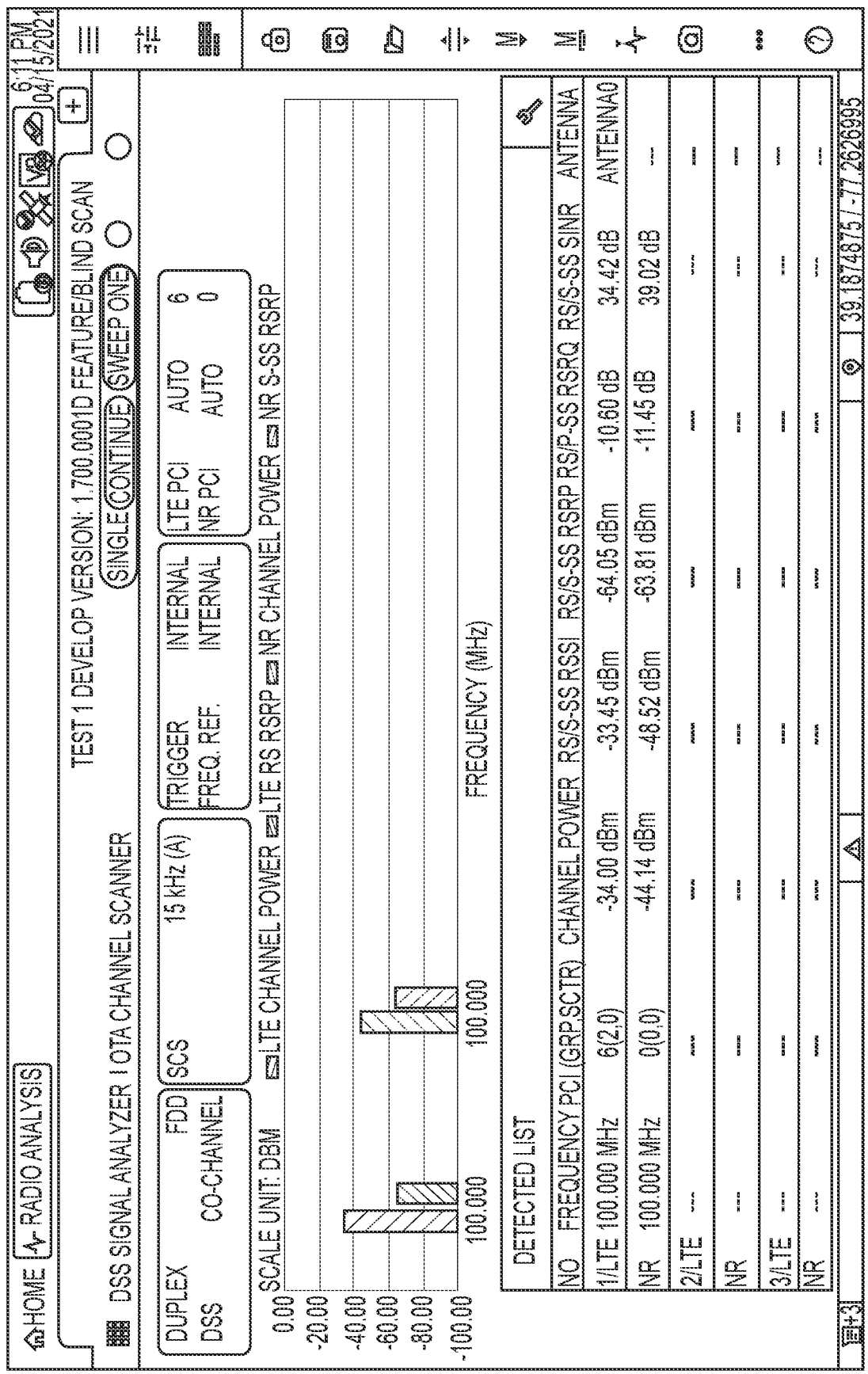

FIG. 6 shows an example GUI showing output from a signal analysis for the detected DSS-FDD channel. For example, the test device 100 can launch the relevant signal analysis application, which in this example is a signal analysis application for the detected DSS-FDD channel. The signal analysis application can display information from the DSS-FDD signal analysis, including carrier frequency for the LTE and NR technologies of the detected DSS-FDD channel, physical cell ID (PCI), channel power, Received Signal Strength Indicator (RSSI), Reference Signal Received Power (RSRP), Reference Signal Received Quality (RSRQ), Signal to Interference plus Noise Ratio (SINR), and antenna and other 3GPP specified parameters. Other relevant signal analysis applications may also be launched based on the other detected channels from the blind scan.

Figure 7:
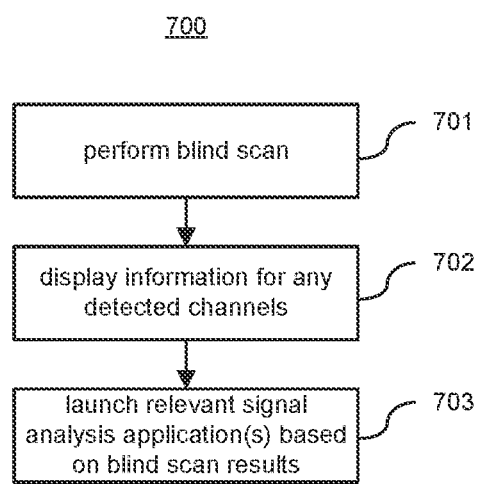
FIGS. 7-8 illustrate flow charts of a method that may be performed by the test device, according to examples.

FIG. 7 shows a flowchart of an example method 700 that may be performed by the test device 100. The steps of the method 700 and other methods described herein can be performed by the test device 100 to perform a blind scan and launch a relevant signal and/or spectrum analysis application with output parameters (e.g., technology and carrier frequency of detected channels) determined from the blind scan.

At 701, a blind scan is performed for all the available channels of user-selected technologies within a user-selected frequency band, such as described above. At 702, information, including technology and carrier frequency, for the detected channels, if any, are displayed, such as described above. Also, occupied bandwidth may be displayed. At 703, one or more relevant signal analysis applications and/or spectrum analysis applications are launched for the detected available channels using the output from the blind scan.

Figure 8:
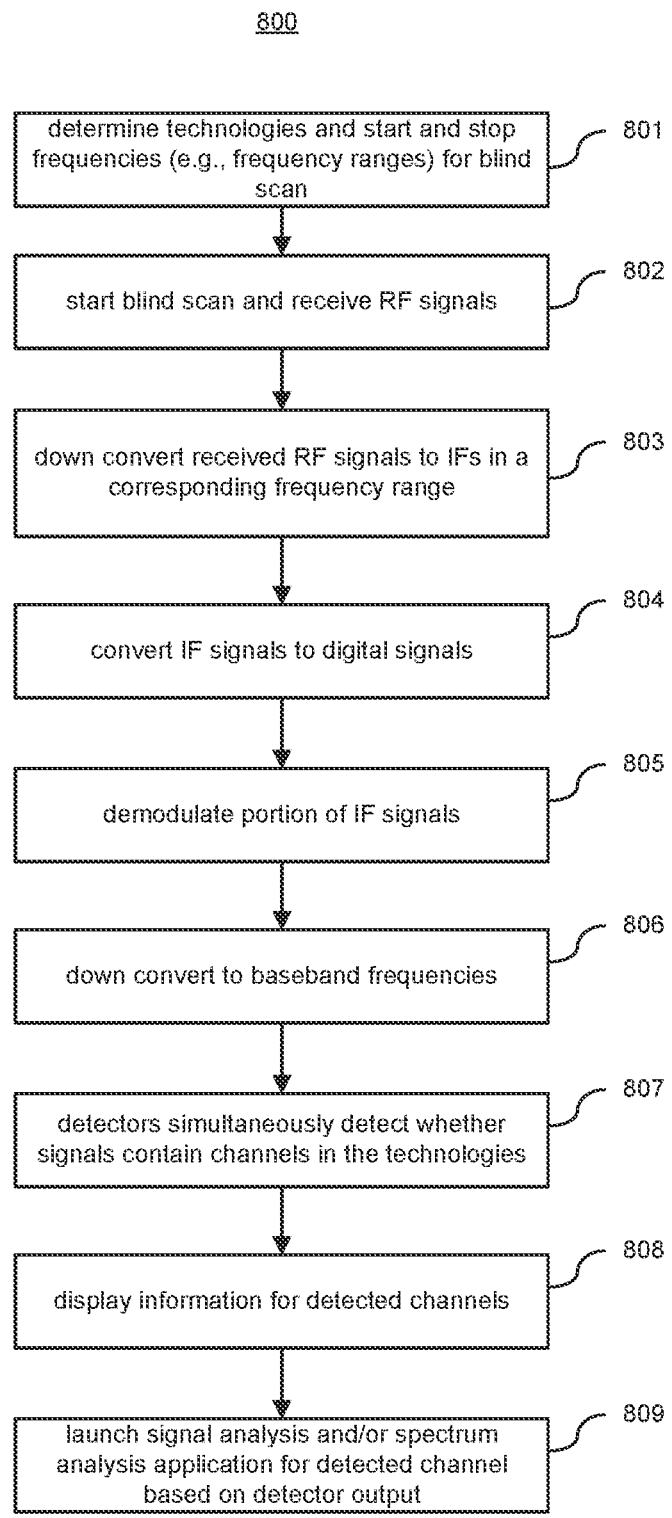

FIG. 8 shows an example method 800 including more details of the method 700. At 801, the test device 100 determines input parameters for the blind scan including one or more technologies and start and stop frequencies for each technology. The start and stop frequencies represent the frequency range of the received RF signals for performing the blind scan. A bandpass filter or other filter may be used to filter the received RF signals for the frequency range. In an example, the user 10 may select the technologies and a frequency range for each technology via a GUI generated on the test device 100. In one example, if the cellular service provider follows the rules of ARFCN (Absolute Radio Frequency Channel Number) and GSCN (Global Synchronization Raster Channel), the user 10 may select band numbers having corresponding frequency ranges as defined by 3GPP standard. If the rules of ARFCN and GSCN are not being followed, then a start and stop frequency may be specified by the user 10 for each technology to be searched.

At 802, the blind scan is started and RF signals are received by the receiver 201 shown in FIG. 2 of the test device 100. RF filters may be used to filter to the frequency ranges determined at 801 for the technologies.

At 803, mixer 202 down converts the RF signals to IFs in a frequency range corresponding to a frequency range determined at 801 for each technology. For example, FIG. 2B-1 shows the RF frequency range of IFs in the frequency range from $f_1$ to $f_2$, which corresponds to the start and stop frequency determined at 801 for a technology.

At 804, ADC 203 of the test device 100 converts the IF signals to digital signals.

At 805, demodulator 204 demodulates a portion of the IF signals to determine I and Q data to be used by the detectors 206 to detect channels in the technologies. For example, a portion of the IF signals, e.g., subframes, carrying primary synchronization signals are demodulated.

At 806, the down converters 205 down convert the digital signals in the IF frequency range from $f_1$ to $f_2$ to baseband frequencies in a frequency range $f_1'$ to $f_2'$ in the baseband frequency domain corresponding to $f_1$ to $f_2$, such as shown in FIG. 2B-1. In an example, to convert to the baseband frequency domain, the center frequency $f_c'=0$ in the baseband frequency domain is mapped to the center frequency $f_c$ of the IF frequency range from the RF frequency domain. The frequency range $f_1'$ to $f_2'$ for the blind scan to be performed in the baseband frequency domain is determined where $f_1'=(f_1-f_2)/2$ and $f_2'=(f_2-f_1)/2$, and negative frequencies are less than the center frequency $f_c'$ and positive frequencies are greater than the center frequency $f_c'$.

At 807, the detectors 206 simultaneously detect whether the signals in the baseband frequency domain contain channels in the technologies. For example, the detectors 206 operate in parallel to sweep the frequency range $f_1'$ to $f_2'$ by performing correlation to detect whether signals (e.g., channels) of the technologies are present in the frequency range $f_1'$ to $f_2'$. Correlation is performed based on the demodulation of a portion of a bandwidth for the channels to be detected, such as discussed above with respect to demodulator 204. For example, the detectors 206 perform correlation to determine whether a predetermined, repeatable pattern, which is specified by the 3GPP standard for each technology channel, is present. If a pattern is identified, the corresponding technology and carrier frequency for the detected channel is determined and stored. The technology channels may include 3GPP defined frequency bands.

At 808, the test device 100 displays information for any detected channels including the technology and carrier frequency. An example is shown in FIG. 4.

At 809, the test device 100 launches a signal analysis and/or a spectrum analysis application for a detected channel based on the output of the detectors 206. Conventionally, to execute the spectrum analysis or signal analysis, the technician must enter the technology and carrier frequency for a channel. However, this can lead to misleading or incorrect signal analysis if the information is not correctly entered or is unknown. The test device 100 determines the technology and carrier frequency for channels detected through the blind scan and stores this information in memory, and then provides this information to the spectrum analysis or signal analysis applications for execution. Thus, the test device 100 can automatically launch the spectrum analysis or signal analysis with the correct technology and carrier frequency for channels based on the output parameters (e.g., technology and carrier frequency for detected channels) determined from the blind scan.

As discussed above, according to an example of the present disclosure, the test device 100 can perform a two-step process. In a first step, the blind scan is performed, and in a second step the signal analysis and/or spectrum analysis is launched with the output of the blind scan, such as the technology and center frequency and bandwidth of channels detected by the blind scan. This provides several technical advantages. For example, a technician doing a cell site installation has the challenge of setting the proper carrier frequency for signal analysis to provide their customers with optimum cellular service. If valid carrier frequencies are not known or if the valid carrier frequency is not manually entered correctly, interference and other issues with the RF channels can be difficult to detect and correct. The test device 100 automatically determines valid carrier frequencies through the blind scan and can launch the signal analysis application to detect interference and other issues for the valid carrier frequencies determined from the blind scan. Also, the test device 100 can perform the blind scan without demodulating entire channels, which allows the blind scan to be performed much quicker than conventional channel searches that may demodulate entire channels. Furthermore, according to an example of the present disclosure, the blind scan circuit shown in FIG. 2A may be implemented partially with an FPGA, such as the digital circuitry shown in FIG. 2A. Then, after the blind scan is performed, the test device 100 reconfigures the FPGA to perform spectrum and signal analysis. This minimizes the amount of hardware resources needed to perform the blind scan and the spectrum and signal analysis.

Figure 9:
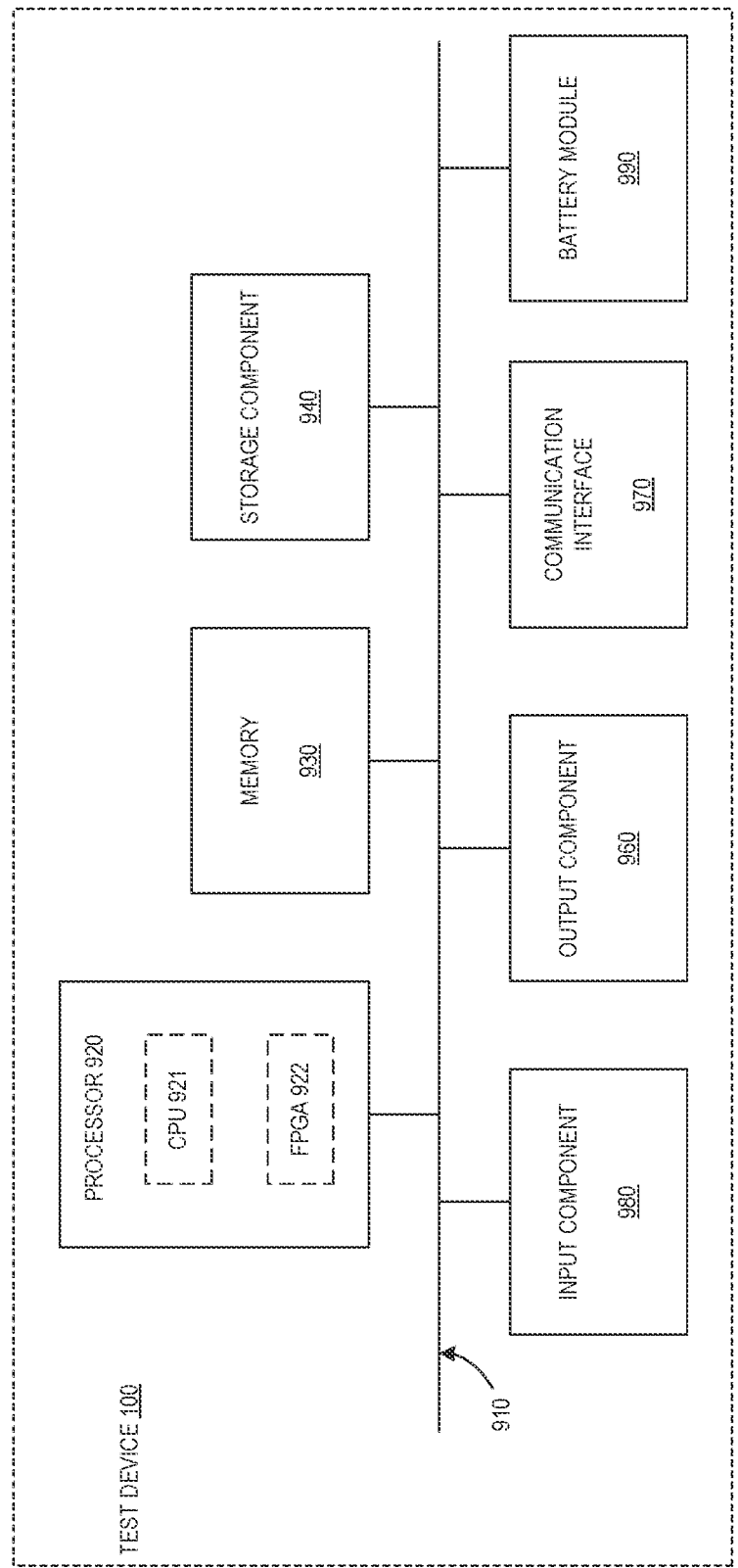
FIG. 9 illustrates a block diagram of the test device, according to an example.

FIG. 9 is a block diagram of the test device 100, according to an example of the present disclosure. Test device 100 may include the components of FIG. 2A and the components shown in FIG. 9. The test device 100 may include a bus 910, a processor 920, a memory 930, a storage component 940, an input component 980, an output component 960, a communication interface 970, and battery module 990.

Bus 910 includes a component that permits communication among the components of test device 100. Processor 920 is implemented in hardware, firmware, or a combination of hardware and software. Processor 920 may include one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 920 includes one or more processors capable of being programmed to perform a function. Memory 930 may include one or more memories such as a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of test device 100. For example, storage component 940 may include a hard disk (e.g., a magnetic disk, solid state disk, etc.) and/or another type of non-transitory computer-readable medium.

Input component 980 includes a component that permits test device 100 to receive information, such as via user input (e.g., a touch screen display, a keyboard, a keypad, a mouse, a button, a switch, and/or a microphone). Additionally, or alternatively, input component 980 may include a sensor for sensing information (e.g., a GPS component, an accelerometer, a gyroscope, and/or an actuator). Output component 960 includes a component that provides output information from test device 209 (e.g., a display, a speaker, a user interface, and/or one or more light-emitting diodes (LEDs)). Output component 960 may include a display providing a GUI, such as GUI 400. Input component 980 and output component 960 may be combined into a single component, such as a touch responsive display, also known as a touchscreen.

Communication interface 970 includes a transceiver-like component (e.g., a transceiver and/or a separate receiver and transmitter) that enables test device 100 to communicate with other devices, such as via a wired connection, a wireless connection, or a combination of wired and wireless connections. Communication interface 970 may permit test device 100 to receive information from another device and/or provide information to another device. For example, communication interface 970 may include an Ethernet interface, an optical interface, a coaxial interface, an infrared interface, an RF interface, a universal serial bus (USB) interface, a Wi-Fi interface, a cellular network interface, or the like.

Battery module 990 is connected along bus 910 to supply power to processor 920, memory 930, and internal components of test device 100. Battery module 990 may supply power during field measurements by test device 100. Battery module 990 permits test device 100 to be a portable device that can be used in the field, such as to test cell site installation.

Test device 100 may perform one or more processes described herein. Test device 100 may perform these processes by processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may instruct processor 920, such as central processing unit (CPU) 921 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 100 may include components other than shown. For example, the test device 100 may include a spectrum analyzer, a signal analyzer and power meter for performing the spectrum and signal analysis applications described above. In an example, the spectrum and signal analysis applications may comprise software executable by CPU 921. In an example, the test device 100 includes FPGA 922. The FPGA 922 may include components of the blind scan circuit shown in FIG. 2A. Also, the FPGA 922 may be reconfigured so it can perform the spectrum and signal analysis applications described above.

The number and arrangement of components shown in FIG. 9 are provided as an example. In practice, test device 100 may include additional components, fewer components, different components, or differently arranged components than those shown in FIG. 9. Additionally, or alternatively, a set of components (e.g., one or more components) of test device 100 may perform one or more functions described as being performed by another set of components of test device 100.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A test device for performing a blind scan, the test device comprising:
   a receiver to receive radio frequency (RF) signals;
   a blind scan circuit to execute a blind scan on the received RF signals to determine whether the received RF signals include channels of certain cellular technologies, the blind scan circuit comprising:
   a demodulator to demodulate a portion of a bandwidth of the channels of the received RF signals that carries a primary synchronization signal for execution of the blind scan;
   digital downconverters to convert the demodulated portion of the bandwidth of the channels of the received RF signals to a baseband frequency range for each of the certain cellular technologies from an intermediate frequency range, wherein a center frequency of the baseband frequency range is determined from a center frequency of the intermediate frequency range; and digital detectors, respectively connected to outputs of the digital downconverters, to perform in parallel and simultaneously primary synchronization signal correlation in the baseband frequency range for each of the certain cellular technologies to detect whether the received RF signals include the channels of the certain cellular technologies; and a processor to launch, responsive to detecting that the received RF signals include at least one of the channels from the blind scan, a signal analysis application or a spectrum analysis application for the at least one channel according to a carrier frequency and a particular cellular technology identified for the at least one channel from the blind scan.

2. The test device of claim 1, wherein the demodulator of the blind scan circuit demodulates the portion of the bandwidth of the channels of the received RF signals without demodulating an entire bandwidth of the channels to execute the blind scan.

3. The test device of claim 1, wherein the certain cellular technologies comprise Long Term Evolution (LTE)-Frequency Division Duplex (FDD), LTE-Time Division Duplex (TDD), New Radio (NR) Dynamic Spectrum Sharing (DSS)-FDD, and DSS-TDD.

4. The test device of claim 3, wherein the blind scan is executed for a downlink channel in FDD or TDD mode.

5. The test device of claim 3, wherein the blind scan determines an occupied bandwidth for a DSS channel detected by the blind scan.

6. The test device of claim 1, wherein the blind scan circuit stores the carrier frequency and the particular cellular technology for the at least one channel in memory, and to launch the signal analysis application or the spectrum analysis application for the at least one channel, the processor retrieves the carrier frequency and the particular cellular technology for the at least one channel from the memory for use by the signal analysis application or the spectrum analysis application.

7. The test device of claim 1, wherein the demodulator demodulates the portion of the bandwidth of the channels of the received RF signals to determine I and Q data, wherein the I and Q data is to be used by the digital detectors to detect the channels for the certain cellular technologies.

8. The test device of claim 7, wherein the signal analysis application determines at least one of physical cell ID (PCI), channel power, Received Signal Strength Indicator (RSSI), Reference Signal Received Power (RSRP), Reference Signal Received Quality (RSRQ), and Signal to Interference plus Noise Ratio (SINR).

9. The test device of claim 1, wherein the blind scan circuit comprises a field programmable gate array, and, to launch the signal analysis application or the spectrum analysis application, the processor reconfigures the field programmable gate array to execute the signal analysis application or the spectrum analysis application.

10. The test device of claim 1, wherein the test device receives via a user interface the certain cellular technologies and frequency ranges for the certain cellular technologies for performing the blind scan.

11. The test device of claim 1, wherein the test device generates a graphical user interface on a display indicating the particular cellular technology and the carrier frequency for the at least one channel detected by the blind scan.

12. The test device of claim 1, wherein the carrier frequency for the at least one channel comprises at least one of a center frequency of the at least one channel and a Synchronization Signal Block (SSB) frequency.

13. A test device for performing a blind scan, the test device comprising:
  a receiver to receive radio frequency (RF) signals;
  a digital blind scan circuit to detect execute a blind scan on the RF signals to determine whether the RF signals include channels of certain cellular technologies, the digital blind scan circuit comprising:
    a demodulator to demodulate a portion of a bandwidth of the channels of the RF signals that carries a primary synchronization signal for execution of the blind scan;
    digital downconverters to convert the demodulated portion of the bandwidth of the channels of the received RF signals from an intermediate frequency range to a baseband frequency range for each of the certain cellular technologies, wherein the intermediate frequency range is based on a down conversion of a frequency range specified by a user for performing the blind scan; and
    digital detectors, respectively connected to outputs of the digital downconverters, to perform in parallel and simultaneously primary synchronization signal correlation in the baseband frequency range for each of the certain cellular technologies to detect whether the received RF signals include the channels of the certain cellular technologies; and
  a processor to launch, responsive to detecting that the RF signals include at least one of the channels from the blind scan, a signal analysis application or a spectrum analysis application for the at least one channel according to a carrier frequency and a particular cellular technology identified for the at least one channel by the blind scan.

14. The test device of claim 13, wherein the demodulator demodulates the portion of the bandwidth of the channels of the RF signals without demodulating an entire bandwidth of the channels to execute the blind scan.

15. The test device of claim 13, wherein the blind scan determines an occupied bandwidth for a Dynamic Spectrum Sharing (DSS) channel to be detected by the blind scan.

16. The test device of claim 13, wherein the test device receives via a user interface the certain cellular technologies and frequency ranges for the certain cellular technologies for performing the blind scan.

17. The test device of claim 13, wherein the carrier frequency for the at least one channel comprises at least one of a center frequency of the at least one channel and a Synchronization Signal Block (SSB) frequency.

18. A method for performing a blind scan by a test device, the method comprising:
  determining certain cellular technologies and frequency ranges for the certain cellular technologies for performing the blind scan;
  receiving radio frequency (RF) signals at a receiver of the test device, wherein the RF signals comprise cellular signals, to perform the blind scan to detect whether the RF signals include channels in the certain cellular technologies;
  down converting the RF signals to intermediate frequency (IF) signals;
  converting the IF signals to digital IF signals;

demodulating a portion of a bandwidth of the channels of the digital IF signals that carries primary synchronization signals for correlation;

down converting the demodulated portion of the bandwidth of the channels of the digital IF signals to baseband frequency signals;

performing simultaneously and in parallel, by digital detectors, correlations of the primary synchronization signals in baseband frequency ranges of the baseband frequency signals for the certain cellular technologies to detect whether the baseband frequency signals include the channels in the certain cellular technologies; and launching, responsive to detecting that the baseband frequency signals include at least one of the channels from the blind scan, a signal analysis application or a spectrum analysis application for the at least one channel according to a carrier frequency and a particular cellular technology identified for the at least one channel by the blind scan.

* * * * *